May 10, 1932. B. HANYZER ET AL 1,857,781
ELECTRICALLY HEATABLE KITCHEN UTENSIL
Filed Nov. 21, 1928
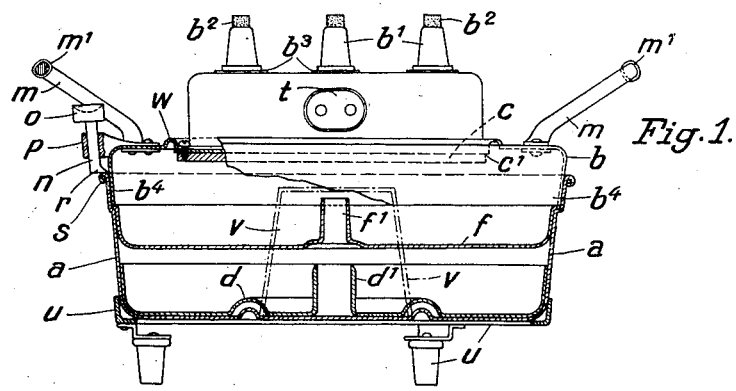
Fig. 1.
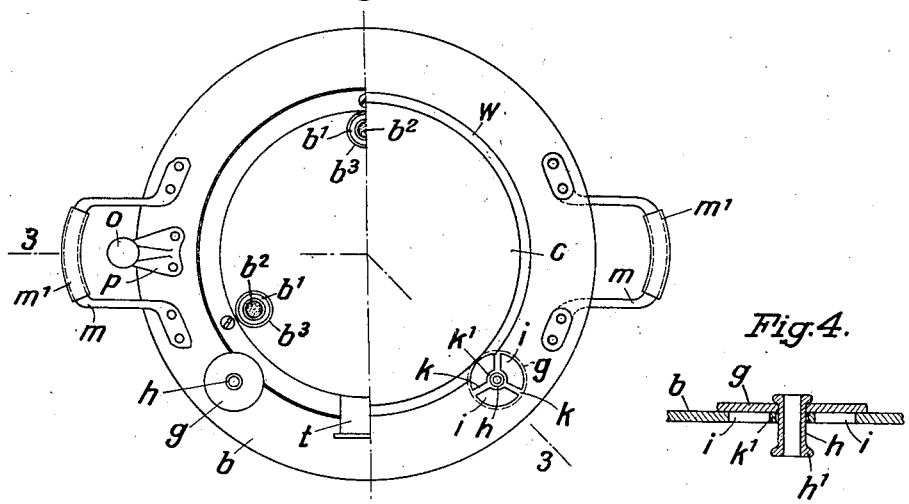
Fig. 2.
Fig. 4.
Fig. 3.
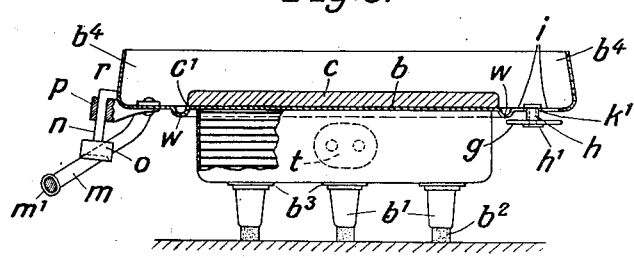
Inventors:
Rudolf Behm
Bruno Hanyzer
By
Attorneys.

Patented May 10, 1932

1,857,781

UNITED STATES PATENT OFFICE

BRUNO HANYZER, OF TEMPELHOF, NEAR BERLIN, AND RUDOLF BEHM, OF CHARLOTTENBURG, NEAR BERLIN, GERMANY, ASSIGNORS TO THE FIRM MULTIPLEX, GASFERNZUNDER-GESELLSCHAFT M. B. H., OF BERLIN, GERMANY

ELECTRICALLY HEATABLE KITCHEN UTENSIL

Application filed November 21, 1928, Serial No. 320,962, and in Germany February 6, 1928.

The invention relates to an electrically heatable kitchen utensil, especially such, in which the heating is effected with the aid of a heating-device which is placed from above upon a vessel.

According to the invention the vessel is to be provided with one or with a plurality of trays, preferably fitted with a central outlet and which are of such design, that the lower tray permits of being placed into the next higher tray.

The invention further consists therein, that the heating-device, capable of being used as a cover, has been so designed and constructed that, apart from the possibility of using it as heating-device from above, it may also be used as heating-device from below.

Furthermore, the invention consists therein, that the heating-device referred to embodies devices, with the aid of which it is possible to effect a separation of the separate parts of the heating-device, if, on account of their close metallic contact, they have jammed.

The invention, furthermore, consists therein that the separation of the separate parts may be easily and conveniently effected.

Moreover, the invention consists therein, that the device has been provided with apertures being partly closable, the closing contrivances of which are automatically removed from the apertures when using the heating-device for the purpose of heating from below.

Further characteristics of the invention will be gathered from the following specification and the accompanying drawings.

In the drawings the invention has been represented by way of example, showing in Fig. 1 an arrangement according to the invention, partly in section, partly in view, Fig. 2 on the left side a plan-view with a part of the utensil in accordance with Fig. 1 seen from above and on the right side seen from below;

Fig. 3 shows a part of the utensil in accordance with Fig. 2 being used as a heating plate, partly in section partly in view;

Fig. 4 represents on an enlarged scale a ventilation-device for the utensil in accordance with the invention in section.

In the drawings $a$ represents a dish-shaped vessel, the cover $b$ of which has been equipped with an electric heating plate $c$. This cover is fitted with the feet $b^1$, with the result that it may also be employed as a heating plate acting from below. The feet $b^1$ consist of a material possessing a bad electric conduction, preferably of porcelain and have been specially insulated from the heating cover by means of intermediate layers of mica $b^3$. The ends $b^2$ of the feet are provided with extensions consisting of cork.

The dish-shaped vessel $a$ is made to contain two trays $d$ and $f$ in superposition. The tray $f$ possesses a central exhausting arrangement $f^1$ suitable for drawing off the gases or vapours developing within the tray $d$. The cover $b$ has for this purpose been provided with valve-plates $g$ capable of being moved up and down with the aid of hollow rivets $h$ provided in the cover. The hollow rivet $h$ constitutes a permanent communication between the space above the tray $f$ and the external atmosphere. The valve-plates $g$ close up apertures in the cover $b$ which, in accordance with Fig. 2 on the right side, are separated by stays $k$. The stays are made to carry an annular part $k^1$, within which the hollow rivet has been disposed and permits of an up and down movement. The hollow rivet $h$ is rigidly connected with the valve-plate $g$ and acts as guide to this part, whenever the valve-plate $g$ is lifted up through the action of the steam. The limitation of the upwards movement of the valve-plate $g$ is effected by the lower rivet-head $h^1$ of the hollow rivet $h$.

By reversing the cover the valve-plates $g$ are removed from the external surface of the cover $b$ through their dead weight, as far as permitted to do so by the hollow rivet $h$, thereby opening the apertures $i$ for the escape of the contents overboiling, which otherwise might cause short circuit by penetrating into the electric heating device at $c^1$. For the purpose of ensuring the escape at any point of the cover, the rim of the cover has been provided with a channel, at the point of connection of the plate $c$ with the rim, which conducts overboiling matter to the escapes $i$.

The cover $b$ fits with its conical rim $b^4$ the vessel $a$ so tightly, as well as the trays $d$ and $f$, that the flow of heat from the cover is immediately transferred not only to the tray $f$, but also to the tray $d$. The tray $f$ simultaneously yields for the contents of the tray $d$ a super-heat. If, however, the super-heat of this tray does not suffice if, e. g. tarts or suchlike are to be baked in the trays, the upper tray $f$ may be taken out of the vessel $a$ and freed from its contents, whereupon the lower tray $d$ is also taken out and, after the replacement of the tray $f$, placed into the latter, with the result that the super-heat emanating from the plate $c$ also immediately acts upon the contents of the lower tray $d$, as it was previously the case with the tray $f$. In order to ensure such an adaptability of the lower tray $d$ to the upper tray $f$, the lower tray has likewise been equipped with a sleeve-like part $d^1$ suitable of enveloping the exhaust $f^1$ of the upper tray, as soon as the tray $d$ is placed into the tray $f$. The exhaust $f^1$, as well as the sleeve-like part $d^1$, is also especially suitable for the purpose of removing the trays from the vessel. To this end, e. g. a corresponding pair of tongs may be made use of, which is passed through the apertures $f^1$ or $d^1$ and grips below the bottom of the tray.

Without the trays $d$ and $f$, but in conjunction with the tray $v$ having the shape of a truncated circular cone, indicated in Fig. 1 by dotted lines, the dish may be used as large baking-form or tin.

A flow or transmittance of heat to the table or other base has thereby been obviated, that the device permits of being placed upon a corresponding support (tripod or suchlike).

$o$ is a press-button, which is passed with a pin $n$ into a holder $p$ attached to the cover $b$. The pin $n$ has been provided at its lower end with a cam $r$ suitable of engaging the rim $s$ of the dish-shaped vessel $a$. The pin $n$ is preferably so shaped, that it permits of being displaced in a longitudinal direction without, however, being rotatable. Its being rotated has thereby been rendered impossible, that the cam $r$ has been so flattened in its shape at the point where it adjoins the rim $b^4$ of the cover $b$ that it is impossible for the pin $n$ to rotate.

It will be seen from Fig. 1, that handles $m$ have been so disposed, that they are in close proximity of the press-button $o$ so that, when lifting off the cover $b$ with the aid of the handles $m$, the thumb is able to press upon the button $o$, whilst the other fingers simultaneously pull the handle $d$ upwards.

The handles $m$ are made to consist of a metal of bad calorific conduction, and, for the further purpose of protection they are coated with cane $m^1$.

In the position as shown in Fig. 3 the cover may be employed as heating plate, by being placed upon the vessel. $t$ is a plug-socket situated at the rim of the heating plate. The disposition at this point has been effected for the purpose of rendering it possible, according to Fig. 3 to employ the cover as heating-plate for heating from below.

We claim:—

1. In combination with a dish electrically heatable from above, a dishlike tray, adapted to be inserted from above into the dish, a dished cover fitted into said dish in open communication with said tray, electrically operated heating means located in said cover, and means to retain said tray at a substantial distance from the bottom of the dish.

2. In combination with a dish in accordance with claim 1, a tube-shaped element attached to the tray capable of permitting gas or steam passing through from the space below it.

3. In combination with a dish in accordance with claim 1, a second tray adapted to be inserted into the dish below the first tray.

4. In combination with a dish in accordance with claim 1, a second tray adapted to be inserted into the dish in axial relation to said first tray, a tube-shaped element on each of said trays capable of permitting gas or steam to pass through, when the trays are in position in said dish.

5. In combination with a dish in accordance with claim 1, a plurality of trays adapted to be inserted into said dish and retained therein at different levels, the upper tray being dimensioned to receive, in nested relation, the tray below it.

6. In combination with a dish in accordance with claim 1, a plurality of trays adapted to be inserted into said dish and retained therein at different levels, the upper tray being dimensioned to receive the tray below it in nested relation, said trays being each provided with a tube-shaped element, capable of permitting gas or steam to pass through, when the trays are superposed, from the space below the upper tray.

7. In combination with a dish in accordance with claim 1, a second tray, adapted to be inserted in the dish below the first tray and in close heat-conducting surface-contact with the wall of the dish.

8. In a dish in accordance with claim 1, the tray being of such nature and so dimensioned, that it is in close heat-conducting contact with the wall of the dish.

9. In an electrically heatable kitchen utensil consisting of at least two superposed elements in close surface contact with each other, a device on one of the said elements adapted to co-act with another element of the utensil and to force the said elements apart in case of jamming.

10. In an electrically heatable kitchen utensil consisting of at least two superposed elements in close surface contact with each other, a device on one of the said elements adapted to co-act with another element of the utensil and to force the said elements apart in case of jamming, the said device consisting of one member rigidly connected to one of said elements and a second member movably connected to the same element, the latter member being adapted to co-act with another of said elements.

11. In a utensil according to claim 10, in which the said first member constitutes a handle and is arranged in such relation to the second member, that the latter can easily be manipulated by the hand holding the handle.

12. In a utensil according to claim 10, in which the said movable member is adapted to rest against the edge of that element adjacent to the element carrying said member.

13. In a utensil according to claim 10, in which the said movable element is displaceable along a guide but is held against rotation relatively thereon.

14. In a utensil according to claim 10, in which the said movable piece is adapted to move substantially parallel to the direction in which the forcing apart of the element takes place.

15. In an electrically heatable kitchen utensil, a reversible heating cover, a rim on said cover adapted to support the same on the vessel to be heated, and supporting means on the heating cover adapted to support the same in a reverse position, the said supporting means being adapted to maintain a certain distance between said heating cover and a table or other support, on which the heating cover may be placed after being reversed from its covering position on the vessel.

16. In a utensil according to claim 15, the said supporting means being in the form of feet.

17. In an electrical heating device, a vessel having a conical form at its upper portion, a reversible cover, a conical rim on said cover adapted to fit the conical upper portion of said vessel, a heating plate on one side of said cover, a heating element on the other side of said cover, means for connecting said plate and said heating element with said cover, and supporting means connected with said cover and adapted to support the same in a reversed position to expose said heating plate.

18. In an electrically heatable kitchen utensil, a vessel, a reversible heating cover, and supporting means on the heating cover adapted to support the same in a reversed position, the said supporting means being adapted to maintain a certain distance between said heating cover and a table or other support, on which the heating cover may be placed after being reversed from its covering position on the vessel.

19. In a utensil in accordance with claim 18, in which said heating cover is provided with an aperture for the escape of steam or gas, and a plate for normally closing the aperture and automatically movable to open the same on reversing the heating cover.

20. In a utensil in accordance with claim 18, in which said heating cover is provided with an aperture for the escape of steam or gas, and a plate for normally closing the aperture, said plate being adapted to be moved by the action of pressure developed in said vessel to open said aperture.

BRUNO HANYZER.
RUDOLF BEHM.